United States Patent [19]

Jon et al.

[11] Patent Number: 4,781,931

[45] Date of Patent: Nov. 1, 1988

[54] CARAMEL-CONTAINING CELLULOSIC ARTICLE

[75] Inventors: Shiu-Chung Jon, Westmont; Myron D. Nicholson, Lemont, both of Ill.

[73] Assignee: Viskase Corporation, Chicago, Ill.

[21] Appl. No.: 144,984

[22] Filed: Jan. 19, 1988

Related U.S. Application Data

[62] Division of Ser. No. 920,381, Oct. 20, 1986.

[51] Int. Cl.$^4$ .............................................. A22C 13/00
[52] U.S. Cl. .................................. 426/132; 138/118.1; 426/135; 428/36
[58] Field of Search ......................... 426/132, 135, 38; 138/118.1; 264/188, 190, 218

[56] References Cited

U.S. PATENT DOCUMENTS

| | | | |
|---|---|---|---|
| 3,860,728 | 1/1975 | Tanner et al. | 426/105 |
| 3,898,348 | 8/1975 | Chiv et al. | 426/135 X |
| 4,038,438 | 7/1977 | Rahman et al. | 426/250 |
| 4,219,574 | 8/1980 | Chiv | 426/135 |
| 4,323,583 | 4/1982 | Basa et al. | 426/250 |

FOREIGN PATENT DOCUMENTS

| | | |
|---|---|---|
| 951252 | 4/1956 | Fed. Rep. of Germany . |
| 1954489 | 10/1959 | Fed. Rep. of Germany . |
| 57-159437 | 10/1982 | Japan . |

*Primary Examiner*—Arthur L. Corbin
*Attorney, Agent, or Firm*—John C. LeFever

[57] ABSTRACT

A caramel-containing, liquid smoke impregnated, cellulosic article, e.g. casing, with the caramel uniformly distributed and immobilized, without chemical bonding, in the cellulose so as to be substantially nonextractable in water and steam and method of producing said article.

4 Claims, 1 Drawing Sheet

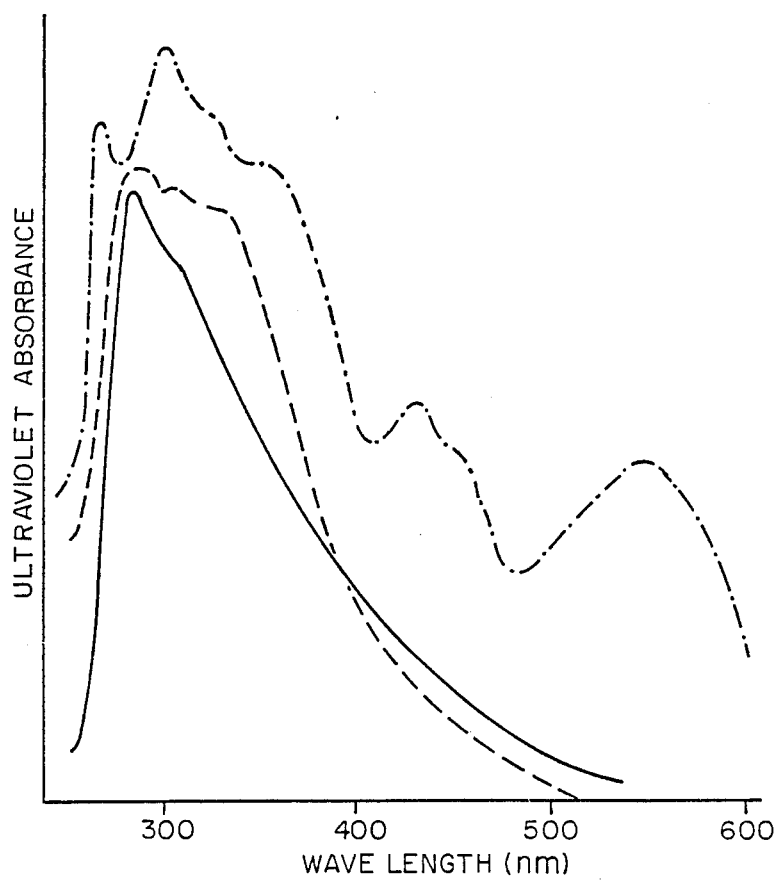

CARAMEL-CONTAINING CELLULOSIC ARTICLE

This application is a division of prior U.S. application: Ser. No. 920,381, filing date Oct. 20, 1986.

BACKGROUND OF THE INVENTION

This invention relates to a caramel-containing cellulosic article and a method for manufacturing this article.

Generally, it is known that for certain food products enclosed in cellulosic food casings, it is desirable to impart color to the casing and/or color and flavor to the encased food during the elevated temperature processing to cook the food.

Caramel has been proposed to impart brown color to the casing and/or the food. Caramel is a brown to black liquid or solid having the characteristic odor of burnt sugar and a pleasant, bitter taste. At normal usage levels it has little or no taste, however. Caramel is prepared by the controlled heat treatment of the following food-grade carbohydrates: dextrose, invert sugar, lactose, malt syrup, molasses, starch hydrolysates and fractions thereof, and sucrose. Various food-grade acids, alkalies, and salts may be used to assist caramelization. From the physical standpoint, caramel consists essentially of colloidial aggregates which are soluble in water but only partly soluble in alcohol-water solutions.

Caramel has also been proposed as a cross-linking agent in the production of collagen casing. U.S. Pat. No. 3,860,728 discloses that the carbonyl functional groups facilitate cross-linking by reacting with the collagen, becoming part of the protein matrix. This is said to enhance the strength and performance of the collagen.

U.S. Pat. No. 4,038,438 discloses impregnation of regenerated cellulose and collagen gel stock casings with caramel solutions. The caramel is then insolubilized by cross-linking. To promote the cross-linking in cellulose, a cationic thermosetting resin is used to cross-link the caramel into the cellulose to produce a nonextractable colored casing.

Canadian Pat. No. 713,510 teaches that for coloring, a caramel coating may be applied to the interior surface of a cellulose casing stick, as for example by slugging the casing interior with a caramel-containing solution. This coating is then transferred to the encased food during the high temperature processing step. A uniform transfer of caramel to the encased food is apparently not contemplated by the patentee because the irregularities of the interior surface of the shirred stick would certainly prevent achieving a uniform coating.

Chiu U.S. Pat. No. 4,219,574 describes a cellulosic food casing in which caramel and an antiblock agent are impregnated in at least one of the interior and exterior surfaces of the casing.

A problem with the aforementioned caramel-impregnated cellulosic article is that the caramel is extractable in water and steam so that when encased food is processed at elevated temperatures in a controlled humidity atmosphere, the caramel is solubilized, extracted from the casing and transferred to the food product. For certain food products this is commercially nonacceptable. For certain products, it is essential that the casing retain its dark brown caramel color. As used herein, "steam" refers to the controlled humidity-elevated temperature conditions commonly used for thermally processing food products.

Still another limitation of caramel-impregnated articles in the form of food casings is that they may not be soaked in water prior to stuffing. Presoaking is commonly practiced and would result in leaching out of the caramel.

For certain food products, it is desired to impart smoke color and flavor to the food product in the food casing. This may be accomplished using vapor derived from controlled oxidation of wood in a smoke house, or by transferring the active color and flavor ingredients from a liquid smoke impregnated casing during the food processing step. These ingredients react with proteins in the food surface by way of the well-known Browning reaction to impart a brown color to the food outer surface. The liquid smoke is also derived from the controlled oxidation of wood to produce vapors which are condensed in water. In some instances, the tar remaining in the condensed liquid smoke is depleted before treatment of the casing. For example, U.S. Pat. No. 4,500,576 teaches that the tar may be depleted by extraction in a solvent such as methylene chloride. Alternatively, the tars may be removed by partial neutralization with a base, preferably in a controlled low temperature range. In other instances, for example with fiber reinforced cellulose casing as described in U.S. Pat. No. 4,377,187, the tars are not removed from the liquid smoke before impregnation.

A limitation of this acidic liquid smoke impregnation approach is that certain customers prefer a darker brown food casing color after thermal processing than can be achieved with low pH liquid smoke or even partially neutralized liquid smoke.

Another method of imparting smoke color and flavor to the encased food is by the use of alkalized liquid smoke in the manner described in U.S. Pat. Nos. 4,442,868 and 4,446,167. The precipitated tars during partial neutralization are resolubilized by the addition of further base to raise the liquid smoke pH to at least 10. The resolubilized tar-containing liquid smoke is then contacted with a surface of the cellulosic casing for impregnation thereof. A relatively dark final casing color results from treatment by such alkalized liquid smoke. However, use of alkalized liquid smoke also creates several additional problems when compared with non-alkalized liquid smokes. These include an undesirable casing odor, non-uniform appearance of the liquid smoke-impregnated casing, and residual tars. Also, when this alkaline smoke treated casing is peeled from the processed food such as meat, the ends of the food product are unacceptably dark and non-uniform. This is because there is more casing per unit area of food surface at the ends, due to wrinkles and gathering of casing.

Still another possible approach to providing the desired dark brown casing color is to introduce one or more pigments by introduction during the casing extrusion step. This does produce a darker casing, but the final casing color on the food product is often rather opaque or nontransparent. In addition, it is difficult to match a natural dark brown color with a combination of pigments.

OBJECTS OF THE INVENTION

One object of this invention is to provide a caramel-containing cellulosic article wherein the caramel is substantially nonextractable in water and steam.

Another object is to provide a caramel-containing cellulosic casing with the caramel immobilized in the casing wall so as to be substantially nonextractable in water and steam and not transfer to food when the film is used to enclose food during moisture-containing processing conditions.

A further object of this invention is to provide a caramel-containing cellulosic casing which is uniformly darker than prior art caramel-impregnated casings.

Another object is to provide a caramel-containing cellulosic casing in a preselected shade of brown.

Still another object is to provide a manufacturing method for caramel-containing cellulosic casing which is less expensive than prior art methods for producing a casing of any desired shade of brown.

A further object is to provide a dark brown cellulosic casing which is odorless, uniform in color, and color stable in water and steam.

A still further object is to provide a caramel-containing liquid smoke impregnated cellulosic food casing which is uniformly darker than prior art casings and which also transfers smoke color and flavor to foodstuff processed in the casing.

An additional object is to provide a caramel-containing cellulosic food casing which may be soaked in water (without significant loss of caramel) prior to stuffing.

Other objects and advantages of the invention will become apparent from the ensuing disclosure and appended claims.

SUMMARY OF THE INVENTION

One aspect of this invention relates to a caramel-containing cellulosic article wherein the caramel is uniformly distributed through the article wall and across the article surface, and immobilized in the cellulose without chemical bonding so as to be substantially nonextractable in water and steam and impart a uniform nongranular caramel appearance through the article. In a preferred embodiment the cellulosic article is a casing, and the caramel is uniformly distributed through the casing wall and across the casing surface in the aforedescribed immobilized form. In a still more preferred embodiment, wood-derived liquid smoke is impregnated in the outer surface of the casing and transferrable through the immobilized caramel-containing cellulosic casing wall to color and flavor absorbable material contiguously associated with the inner wall of the casing and without simultaneous transfer of the caramel to the absorbable material. In this embodiment the color of the article is dark brown. The liquid smoke may be concentrated, may contain tars or may be tar-depleted.

"Chemical bonding" as used herein is the union of atoms to form compound substances. The forces that keep the union intact are electrical and result in changes in the individual atom's electronic structure. Examples are covalent and ionic bonds. Covalent bonding results between atoms where certain electrons are shared during bonding, and ionic bonding occurs when an electron is transferred from an electron-rich atom to an electron-deficient atom. Chemical bonds of this type are relatively stable, requiring 30–200 k cal/mole of energy to disrupt them. Chemical bonding is not intended to encompass other types of "weak" attractive intermolecular forces such as Van der Waals forces and hydrogen bonding. This type of attraction is manifest in many chemicals and is readily reversible. For reference, hydrogen bonds can be broken by input of 5–8 k cal/mole of energy. These weak attractive forces can be responsible for molecular aggregation.

In a method aspect of the invention, the caramel-containing cellulosic article is manufactured by the alkali cellulose, xanthate, viscose and acid-bath regeneration procedure. The improvement comprises mixing caramel with the viscose solution to form caramel-containing viscose, contacting the caramel-containing viscose with an acid-salt bath to regenerate the cellulose, and immobilizing the caramel in the cellulose without chemical bonding in a uniformly distributed form through the article mass and across the article surface so as to be substantially nonextractable in water and steam. In a preferred embodiment of this method the caramel-containing viscose is extruded into a tube with or without a fibrous reinforcement and contacted with an acid-salt bath to regenerate the cellulose, immobilize the caramel in the cellulose in a uniformly distributed form through the tube wall and across the tube surface so as to be substantially nonextractable in water and steam.

This invention also includes a method for manufacturing a caramel-containing cellulosic article comprising:

(a) steeping cellulose starting material in an aqueous alkaline solution to form alkali cellulose;

(b) mixing the alkali cellulose and carbon disulphide to form cellulose xanthate;

(c) dispersing said cellulose xanthate in an aqueous alkaline solution to form viscose, and aging the as-formed viscose;

(d) mixing caramel with said viscose during step (c) to form aged caramel-containing viscose; and (e) contacting said aged caramel-containing viscose with an acid-salt bath to regenerate the cellulose, immobilize the caramel without chemical bonding in a uniformly distributed form through the article mass and across the article surface so as to be substantially nonextractable in water and steam.

In a preferred embodiment of this method, the aged caramel-containing viscose from step (a) is extruded into a tube and contacted with an acid-salt bath to regenerate the cellulose, immobilize the caramel in a uniformly distributed form through the tube wall and across the tube surface so as to be substantially nonextractable in water and steam.

The prior art teaches the use of certain other water soluble additives with viscose prior to the coagulation and cellulose regeneration steps. In particular, German Pat. No. DE-OS 16 92 203 describes the addition of gelatine and blood prior to the extrusion step, blood being water dispersible with many serum proteins which are water soluble like gelatin. The purpose of this addition was to provide a cellulosic casing with an off-white natural color and an internal surface which enhances adherence of the casing to the meat product. It is not surprising that compounds in the molecular weight range of blood and gelatine (70,000 and 10,000–100,000 respectively) do not readily leach out of regenerated cellulose films, as cellulose is generally known to have a permeability upper limit in the 12,000–18,000 molecular weight range. Similarly, German Pat. No. 95 12 252 teaches the additives of proteins to viscose such as casein with a molecular weight of 75,000 to 375,000. Again, such a high molecular weight material would not be expected to be leached out of the regenerated cellulose film.

It was therefore surprising and unexpected that relatively low molecular weight (primarily below 10,000) and water soluble caramel may be rendered substantially nonextractable in water and steam in a cellulosic article without evidence of chemical bonding.

DESCRIPTION OF PREFERRED EMBODIMENT

The starting material in the manufacture of cellulosic food casings is high quality relatively pure cellulose pulp (either cotton or wood), most typically in sheet form. A suitable density range for cellulosic sheets in the practice of this invention is about 0.8-0.9 gm/cc.

The relatively pure cellulose is converted to alkali cellulose by steeping in a sodium hydroxide solution. Cellulose absorbs the sodium hydroxide and the fibers swell and open. The degree of steeping is preferably held to the minimum amount necessary to ensure uniform distribution of the sodium hydroxide on the cellulose. A steeping bath temperature of about 19°-30° C. is preferred, and a typical sodium hydroxide concentration in the steeping bath is about 17-20 wt.%.

In a typical steeping apparatus there is no forced circulation of caustic between the cellulose sheets, so it is important that the rate of filling the apparatus with caustic (fill rate) be such that the caustic reaches every portion of the sheets. They are typically held in place in the steeping chamber by a support frame, and a typical steep time in commercial practice is 50-60 minutes.

After steeping, the caustic is drained and excess absorbed sodium hydroxide solution is pressed out, typically by a hydraulic ram. A typical alkali cellulose composition is about 13-18% caustic, 30-35% cellulose and the remainder water (by wt.). The percent caustic and cellulose in the alkali cellulose is controlled by the well-known press weight ratio. This ratio is the weight of the wet cake after pressing divided by the weight of the original cellulose used. A typical press ratio is about 2.6-3.2. After the press out, the alkali cellulose is shredded, ie. the fibers in the sheet are pulled apart so that during xanthation the carbon disulphide contacts all portions of the alkali cellulose. There is an optimum shredding time for each system which can only be determined by testing. Typical shredding time is about 40-90 minutes. Heat is generated during the shredding step and the temperature may for example be controlled by means of a cooling water jacket around the shredder, preferably in the range of 25°-35° C.

During a succeeding preferred aging step, an oxidative process is initiated which breaks the cellulose molecular chains thereby reducing the average degree of polymerization which will in turn reduce the viscosity of the viscose to be produced. During the aging step the shredded alkali cellulose is preferably maintained in covered vessels to prevent drying.

Xanthation—the conversion of alkali cellulose to xanthate cellulose—is accomplished by placing the shredded and aged alkali cellulose in a closed reactor and adding carbon disulphide which vaporizes and reacts with the alkali cellulose to form xanthate cellulose. The amount of carbon disulphide used to achieve the desired conversion to xanthate cellulose is typically equal in weight to about 26-38% of the bone dry wt. cellulose in the alkali cellulose, and preferably only enough to produce cellulose xanthate with acceptable filtration characteristics.

The percent total sulphur is directly related to the amount of carbon disulphide introduced, including xanthate and by-product sulphur. The length of time required for the xanthation reaction depends on the reaction temperature and the quantity of the carbon disulphide. The tolerance on the temperature, pressure and quantity of carbon disulphide used during xanthation is preferably determined by the tolerance on the total sulphur content. In general, the xanthation conditions are varied to insure that adequate conversion and the total sulphur content greater than about 1.1 wt. % is achieved. Typically there is about 0.4-1.5% by wt. sulphur in the by-products admixed with cellulose xanthate.

The purpose of converting alkali cellulose to xanthate cellulose is to enable dispersion of the cellulose in a dilute solution of sodium hydroxide, eg. 3.6-5.0 wt.%. This is the so-called viscose formation or "vissolving" step, in which sodium hydroxide is absorbed onto the xanthate cellulose molecule which becomes highly swollen and dissolves over a finite time period. This step is preferably accelerated by cooling and agitation. Sufficient cooling is preferably provided to initially maintain the mixture at about 10° C. This temperature is thereafter preferably allowed to rise to about 20° C. The quality of the dispersion is typically determined by measuring the amount of viscose filtered through a cloth filter of 1 $cm^2$ area in a one hour time interval. The viscose is allowed to ripen, deaerate and is filtered under controlled temperature and vacuum. During ripening there is a more uniform distribution of the xanthate group on the cellulose and a gradual decomposition of the xanthate molecule which progressively reduces its ability to remain dissolved, and increases the ease of viscose-cellulose regeneration.

Viscose is essentially a solution of cellulose xanthate in a solution of sodium hydroxide which has been aged to a specific degree of precipitability. If the desired product is a tube, the viscose is extruded into a tubular cellulose film. The tubular form is obtained by forcing the viscose through a restricted opening, as for example an annular gap. The diameter and gap width of the opening, as well as the rate at which the viscose is pumped through, are designed in a manner well known to those skilled in the art for both non-reinforced and fiber-reinforced products such that a casing of cellulose film of specific wall thickness and diameter is formed from the viscose.

The extruded viscose casing is converted to cellulose in the extrusion bath by action of acid-salt, for example sulphuric acid and sodium sulphate. A typical bath contains about 7-18% sulfuric acid by weight, and the bath temperature may be about 30°-56° C.

The cellulose casing emerging from the regeneration bath is preferably passed through several dilute acid baths. The purpose of these baths is to ensure completion of the regeneration and to further remove water from the casing. During regeneration, gases (mainly $H_2S$ but also some $CS_2$) are released through both the inner and outer surfaces of the casing, and means must be provided for venting this gas. After the casing has been thoroughly regenerated and the salt removed, it is preferably passed through a series of heated water baths to wash out residual acid and boil off carbon disulphide entrapped in the casing wall.

The casing embodiments of the present invention may also contain other ingredients which may be suitably used in treating a tubular food casing, e.g., glycerine and/or propylene glycol which may be used as humectants or softening agents, and the like, or other antimycotic agents.

Other ingredients which are normally used in the manufacture of, or for further treatment of the food casings, e.g., cellulose ethers and mineral oil, may also be present in the casing if desired, and they may be used in the same manner and amounts as if the invention had not been practiced.

In particular, agents for improving the peelability of the casings from food products such as sausages, e.g., frankfurters, bolognas and the like, may be optionally coated on the internal surface of casings.

Such peelability enhancing agents include, but are not limited to, carboxymethyl cellulose and other water soluble cellulose ethers, the use of which is disclosed in U.S. Pat. No. 3,898,348 issued Aug. 5, 1975 to Chiu et al., the disclosure of which is incorporated herein by reference; "Aquapel," a Hercules, Inc. trademarked product comprising alkyl ketene dimers, the use of which is further disclosed in U.S. Pat. No. 3,905,397 issued Sept. 16, 1975 to H. S. Chiu, the disclosure of which is incorporated herein by reference; and "Quilon," and E. I. Dupont de Nemours Co., Inc. trademarked product comprising fatty acid chromyl chlorides, the use of which is further disclosed in U.S. Pat. No. 2,901,358 issued Aug. 25, 1959 to W. F. Underwood et al., the disclosure of which is incorporated herein by reference.

The peelability enhancing agent may be applied to the internal surface of the tubular food casings by using any one of a number of well-known methods. Thus, for example, the peelability enhancing agent can be introduced into the tubular casing in the form of a "slug" of liquid, in a manner similar to that disclosed, for example, in U.S. Pat. No. 3,378,379 to Shiner et al. Advancing the casing past the liquid slug coats the inner surface thereof. Alternatively, the peelability enhancing agent may be applied to the internal surface of the casing through a hollow mandrel over which the casing is advancing as, for example, a shirring machine mandrel in a manner similar to that described in U.S. Pat. No. 3,451,827 to Bridgeford.

Casings of this invention are also suitable for the processing of what is conventionally known in the art as "dry sausages." Unlike other types of non-fibrous casings which are preferably easy to peel from the food products, either by the food processor before sale to the customer or by the consumer, "dry sausage" casing preferably adheres to the food product during and after processing. "Kymene," a Hercules, Inc. trademarked product which is a polyamide epichlorochydrin resin, the use of which is further disclosed in U.S. Pat. No. 3,378,379 issued Apr. 16, 1968 to Shiner et al., the disclosure of which is incorporated herein by reference, may optionally be internally coated on the internal surface of the casings of this invention. The casing of this invention may also be printed, e.g., a casing having an insignia, trademark, lettering, and the like printed thereon, having the caramel color incorporated therein. Exemplary printed casings are disclosed in U.S. Pat. No. 3,316,189.

Immobilized caramel-containing casings of this invention may be prepared then coated either internally or externally with a moisture-impervious barrier, e.g., a polyvinylidene chloride copolymer resin (PVDC) thus resulting in a moisture-proof (MP) casing article. Exemplary MP coating techniques are disclosed in U.S. Pat. Nos. 2,961,323, 3,328,330 and 3,369,911.

EXAMPLE 1

A series of experiments were conducted which demonstrate that to prepare the inventive article and also to practice the inventive method, caramel must be introduced after the xanthation step and before the cellulose regeneration step.

In samples 1 through 7, 64.0–64.85 grams of wood pulp sheets were steeped in a bath containing about 17.5 wt.% NaOH at about 28° C. and 1 atm for a period of about 60 minutes, and the excess alkali was pressed out to form alkali cellulose containing 30.1–32.7% cellulose, 13.86–14.98% NaOH and the balance water. The shredding time and temperature were 60 minutes and 25° C. respectively. The shredded alkali cellulose was aged for about 130 minutes, as measured from the time of initial steeping until start of xanthation. For xanthation, 13.01–14.13 grams $CS_2$ were added to the aged shredded alkali cellulose, corresponding to about 28.8% of the bone dry weight cellulose in the alkali cellulose. The xanthation time and temperature were about 130 minutes and about 28.5° C. respectively. The color of the cellulose xanthate was observed and caustic was added in sufficient quantity for the vissolving step to form a mixture containing about 7.0% cellulose, 5.1% NaOH and 1.7% sulfur. The viscose was aged at a temperature of about 22° C. for a period of about 17 hours followed by filtration through a filter cloth media.

A portion of the filtered viscose solution was placed on a glass plate and formed into a film by drawdown with a coating bar having a clearance of 0.030 inches from the glass plate. The viscose film on the glass plate was then immersed in an acid-salt solution at 25° C. for a period of 15 minutes to gel the viscose.

This acid solution was made to the following composition:
206 gm 98% sulfuric acid
3,000 gm ammonium sulfate
3,000 gm sodium sulfate
Water to make up a total solution of 4 gallons.

The gelled viscose on the glass plate was then placed on an embroidery hoop and immersed in an acid-salt solution at 25° C. for a period of 15 minutes to regenerate the viscose. This acid solution was made to the following composition per 100 gm solution:
10 gm sulfuric acid
20 gm sodium sulfate with the remainder water.

The regenerated viscose film was then washed in a container with water added at a constant overflow at a temperature of 30° C. for a period of 45 minutes. The film was then immersed in an aqueous glycerine solution containing 10 gm glycerine per 100 gm solution for a period of 15 minutes. The sample was then dried in ambient air. The films were tested for caramel color loss by boiling in water for 5 minutes and allowed to stand for one hour. The color of the film was compared before and after this treatment and the color of the water extract was also observed.

Sample 1 was the control with no caramel addition. For samples 2–7, the caramel (purchased from Sethness Products Company, Clinton, Iowa) in the powder form under their product designation type BC #420 and having a tinctorial power of 0.420, (measured as a 0.1 wt.% solution absorbance per cm at 560 nm) was added in a quantity of 8.9 gm for all samples except samples 3 and 7 as discussed below. Samples 2–7 had 18.1–19.7 parts caramel to 100 parts cellulose. No additives were used, as for example, materials which might promote chemical bonding between the caramel and cellulose.

Referring now more specifically to the point of caramel addition in the cellulose manufacturing process for the various samples, they were as follows:
Sample 2:

The caramel was mixed with 26.7 gm water and the resulting mixture was added to the wood pulp sheets by means of an eyedropper. The aqueous caramel solution permeated through the sheets which were allowed to dry.

Sample 3:

The caramel was added to a 17.5 wt.% NaOH steep solution, which comprised 144 gm caramel and 2500 ml of 17.5% NaOH solution. The steeped sheets were as dark as the original steep solution. However, after pressing the alkali cellulose sheets changed from dark brown to tan color.

Sample 4:

After 15 minutes of shredding, the caramel powder was added to the alkali cellulose shredder. After this addition, the mixture did not shred properly as the cellulose strands appeared to agglomerate rather than separate. The viscose made from this xanthate had a significantly higher viscosity which was unacceptable for commercial use.

Sample 5:

The caramel was added to the viscose during vissolving and before aging.

Sample 6:

The carmel was added to the viscose after aging.

Sample 7:

The caramel was added to the glycerine bath. After the film was cast from the control Viscose (sample 1), gel stock was soaked in a glycerine solution containing 6% caramel and 10% glycerine (both by weight) for 15 minutes as a final softening step.

The results of these experiments are summarized in Table A.

after regeneration; all of the caramel color was removed from sample 7 during the boiling water immersion. It appears that regeneration with the caramel in the viscose immobilizes the caramel so completely that it is not extracted to a significant extent even by boiling water.

It appears from sample 4 that when the caramel is added to the alkali cellulose during shredding it interferes with the normal course of viscose preparation. This is suggested by the extremely high viscosity, poor filtration and the uneven color of the cellulose xanthate. Caramel interference with the xanthate reaction is also suggested by the low xanthate sulfur content and a visually observed higher gel content of the viscose. Sample 4 was also unique in producing films of noticeable roughness due to unxanthated occlusions, from poor quality viscose. In marked contrast, all the other samples were smooth.

Table A also shows that when caramel is added to the wood pulp sheets or during NaOH steeping, the efficiency of caramel use as a colorant is very poor, i.e. the final film was a tan color in contrast to the dark color obtained with samples 5 and 6. The slightly lower xanthate sulfur content and lower filter number of sample 5 compared with the essentially identical performance of samples 6 and 1, suggests that caramel addition after viscose aging is preferred.

EXAMPLE II

Another series of tests were conducted to demonstrate the range of food casing color darknesses achievable by the present invention, and absence of color transfer to food processed in the casing. There were no constituents in addition to those specifically mentioned.

TABLE A

| Sample No. | Weight Of As Is Pulp | Alkali Cellulose Composition | | Viscosity (cp.) | Filter Number | Xanthate Sulfur | Appearance After Xanthation | Appearance After Vissolving & Before Aging | New Color After Boiling (Change)[1] | Color Of Water Extract (Change)[2] |
|---|---|---|---|---|---|---|---|---|---|---|
| | | % Cell | % NaOH | | | | | | | |
| 1 | 64.85 | 31.7 | 14.98 | 9,920 | 209 | 1.46 | Medium Orange | Medium Orange | Clear (control) | Clear (control) |
| 2 | 77.50[3] | 31.3 | 14.85 | 13,280 | 24 | 1.41 | Reddish Brown | Dark Brown | Light Tan (no change) | Very Slight Discoloration (very slight change) |
| 3 | 64.31 | 32.7 | 14.14 | 15,360 | 27 | 1.21 | Reddish Brown | Brown | Light Tan (no change) | Very Slight Discoloration (very slight change) |
| 4 | 64.11 | 30.1 | 13.86 | 103,040 | 0 | 1.09 | Very Dark Brown | Viscous Very Dark Brown | Medium Brown (no change) | Slight Discoloration (very slight change) |
| 5 | 64.14 | 31.8 | 14.83 | 15,800 | 29 | 1.39 | Medium Orange | Dark Brown | Dark Brown (no change) | Slight Discoloration (slight change) |
| 6 | 64.00 | 32.2 | 14.71 | 11,000 | 221 | 1.45 | Orange | Orange | Dark Brown (no change) | Slight Discoloration (slight change) |
| 7 | — | — | — | — | — | — | — | Medium Orange | Clear (greatest change) | Dark Brown (greatest change) |

[1]Degree of film color change after extraction versus before extraction.
[2]Degree of water discoloration after extraction versus before extraction.
[3]Includes weight of caramel and any non-evaporated water.

Examination of Table A demonstrates that the desired permanent dark caramel color was not obtained unless the caramel was added after the xanthation step. This was realized in samples 5 and 6 as embodiments of the invention, but not with samples 2–4 wherein caramel was added before xanthation. Table A also demonstrates that the desired permanent dark caramel color is not obtained if the caramel is added after xanthation and The casings used in these tests were the commercially available fiber reinforced cellulosic type in the size range of 7½ to 9, and the nine samples were as follows:

Sample 8:

A quantity of 23 gms. of the aforementioned Sethness BC 420 caramel was introduced in 2690 gms. of viscose prior to extrusion. The mixture was processed and the casing extruded in the manner of sample 6.

Sample 9:

A quantity of 34 gms. of Sethness type AP 680 caramel powder was introduced to 2690 gms of aged viscose prior to aging. The mixture was processed and the casing extruded in the same manner as sample 8.

Sample 10:

The same quantity of the same type of caramel was introduced in viscose as in sample 8, and 23 gms/in² (3.55 mg/cm²) of Charsol type C-12 liquid smoke (obtained from Red Arrow Products Company, Manitowac, Wis.) were impregnated in casing in accordance with the teachings of U.S. Pat. No. 4,377,187, incorporated herein by reference. This type of liquid smoke contains tars.

Sample 11:

The same quantity of the same type of caramel was introduced in the viscose as in sample 9, and 23 mg/in² (3.55 gm/cm²) of Charsol C-12 liquid smoke were impregnated in casing in the same manner as sample 10.

Sample 12:

There was no caramel addition but 23 mg/in² (3.55 gm/cm²) of Charsol C-12 liquid smoke were impregnated in the casing outer wall in the same manner as sample 10. The unaged casing was stuffed with ham.

Sample 13:

This article was identical to sample 12 except the casing was aged for approximately 9-12 months at 75° F. (24° C.) before stuffing.

Sample 14:

This was a commercially available liquid smoke treated fibrous casing sold by TeePak Company, Danville, Ill., under the product designation "Redi Reel Smoke—EZE". The smoke loading on the casing is unknown.

Sample 15:

This was the control casing which did not contain caramel and was not impregnated with liquid smoke.

Each sample was stuffed in a Vemag Model 3000S machine with a mixture comprising 65% whole muscle ham and 35% chunked ham. Pickle solution was added to this mixture to the extent of 35 wt.% of the total. The stuffed articles were thermally processed at 140°-180° F. (60°-82° C.) until an internal product temperature of 150° F. (66° C.) was obtained. A 40% relative humidity was maintained throughout the processing cycle. Colorimetric measurements were taken on all stuffed casings and also on the processed hams after peeling of casing samples 10-15. The samples were also evaluated by a color panel comprising ten individuals who inspected the stuffed casing after processing, and also the processed hams after packing. Each sample was evaluated on a 1 to 9 scale (lowest to highest rating) for (a) color intensity and (b) overall color acceptability.

The results of these color evaluations are summarized in Table B as follows:

TABLE B

| Sample | Casing | Peel-ability[1] | Colorimetric Values L[3] | Colorimetric Values a[4] | Color Panels[2] Intensity | Color Panels[2] Overall Acceptability |
|---|---|---|---|---|---|---|
| 8 | On | 0 | 31.2 | 17.0 | 4.3 | 4.8 |
|   | Off |   | — |   |   |   |
| 9 | On | 0 | 22.4 | 15.2 | 5.8 | 3.5 |
|   | Off |   | — |   |   |   |
| 10 | On | 2 | 27.0 | 18.4 | 4.5 | 5.1 |
|    | Off |   | 41.7 | 16.2 | 3.8 | 4.5 |
| 11 | On | 2 | 19.8 | 16.5 | 5.9 | 3.5 |
|    | Off |   | 38.2 | 17.4 | 4.1 | 4.5 |
| 12 | On | 3 | 38.9 | 17.4 | 2.9 | 3.4 |
|    | Off |   | 40.2 | 16.4 | 3.2 | 3.9 |
| 13 | On | 3 | 36.6 | 16.7 | 3.2 | 3.6 |
|    | Off |   | 39.0 | 17.0 | 3.6 | 4.5 |
| 14 | On | 5 | 28.3 | 17.0 | 4.7 | 4.4 |
|    | Off |   | 32.7 | 16.3 | 5.3 | 3.2 |
| 15 | On | 3 | 42.4 | 15.5 | 1.6 | 2.1 |
|    | Off |   | 44.9 | 14.9 | 1.6 | 2.1 |

[1] Peelability rated on a 0-5 scale: 0 = No peelability, scarring of meat surface 5 = Excellent peelability
[2] Color panels on 1-9 scale with 5 being most preferred and 9 darkest.
[3] "L" values represent light vs. darkness: the lower the value, the more dark the sample.
[4] "a" values represent redness: the higher the value, the more red the sample.

All of the casing samples were extremely uniform in color. Neither colorimetric values nor color panel evaluations were obtained on the hams processed in samples 8 and 9, because there was no transfer of caramel color from the casings. However, sample 9 (dark caramel) was as dark as sample 14, the commercially available liquid smoke treated casing. Samples 10 and 11 demonstrate that by liquid smoke impregnation of the caramel-immobilized cellulosic casing of this invention, the smoke color and flavor may be transferred through the caramel-containing casing wall to the food processed therein. That is, the caramel immobilized in the cellulosic article does not impede transfer of smoke color and flavor to the encased food.

Samples 8, 9 and 15 were tested for caramel color and for flavor transfer to the finished ham surface, and the results are summarized in Table C.

TABLE C

| Sample | (Color Panel) | Colorimeter Reading* | Ham Flavor Intensity |
|---|---|---|---|
| 8-Fat | 2.6 (overall) | 55.9 | 3.4 |
| Lean |   | 40.7 |   |
| 9-Fat | 3.3 (overall) | 54.8 | 2.9 |
| Lean |   | 40.2 |   |
| 10-Fat | 2.9 (overall) | 53.5 | 3.4 |
| Lean |   | 42.7 |   |

*The colorimeter value ranges between 0 (dark) to 100 (white).

Inspection of Table C reveals that there was no discernable color transfer (as determined by color panel or colorimeter) from the caramel-immobilized cellulosic fibrous casing to the ham surface, and no differences in ham flavor intensity between meat product processed in the inventive casing and the control casing.

EXAMPLE III

This experiment was conducted to demonstrate that comparable casing caramel color intensity may be achieved in the inventive article by using different types of caramel. Sample 16 was produced using 11.6 gms of Sethness type 858 caramel powder, introduced in 2706 gms of aged viscose prior to extrusion with no other additives. The mixture comprising 0.86 wt.% caramel was processed and the non-fiber reinforced cellulosic casing extruded in the same manner as sample 8.

Due to caramel's intrinsic tinctorial or coloring power, different types of caramel powder can be used to produce the present caramel-immobilized cellulosic article with similar color intensity. For purposes of this specification including Example III, tinctorial power is determined by mixing 0.1 wt.% caramel in water and measuring the visible absorbance of the solution at 560 nm using a commercially available spectrophotometer. The tinctorial power of Sethness type BC 420 and type 858 caramel powders are 0.420 and 0.858 respectively. On this basis, approximately twice the amount of type BC 420 caramel in comparison with type 858 caramel is required to achieve a similar cellulosic article caramel color intensity when practicing this invention. Accordingly, sample 17 containing 23.2 gms Sethness type BC 420 caramel was prepared and processed in the same manner as sample 16. When compared visually, samples 16 and 17 had comparable dark brown color intensity.

EXAMPLE IV

The purpose of this experiment was to demonstrate that the mechanism for immobilizing the caramel in the regenerated cellulosic article is physical and not chemical.

A slurry was prepared comprising 9 gm of the caramel-containing cellulosic casing of sample 16, and 150 gm of an ammonia/ammonium thiocyanate 25/75% mixture. The slurry was placed in a closed jar and rolled for 5 hours. While the casing did not dissolve noticeably, swelling was observed and the solvent system turned to a brown color within the first hours. After rolling, the slurry was cooled to −65° C. and froze to a solid mass in 20 minutes, after which it was thawed and refrozen. The freeze/thaw cycle was performed three times followed by overnight storing at −65° C. The slurry was again thawed and appeared as a homogeneous, clear brown viscous solution. A film was cast from the slurry and regenerated in a 10 wt.% solution of $H_2SO_4$ in water. The film was very weak, very porous, and had lost most of its dark brown color. The brown color was noticeable in the regeneration bath.

The absence of significant brown color in the resulting film demonstrates that the caramel-immobilizing mechanism is not by chemical bonding. Had caramel been chemically bonded to the cellulose, the regenerated film would have been the same dark brown color of the original casing sample 16. Instead, the caramel (although nonextractable in water and steam) was dissolved in the ammonia/ammonium thiocyanate system. As for example discussed in Cuculo U.S. Pat. No. 4,367,191, this cellulose solvent system is reported to function not by reaction with the cellulose but by swelling and disrupting the hydrogen bonding of the cellulose matrix.

EXAMPLE V

A series of experiments were performed to demonstrate that the caramel in the caramel-immobilized cellulosic article of the invention is substantially nonextractable in water and steam. The experiments also included caramel extractability at high temperature in 3% acetic acid and heptane.

The procedure was that outlined in 21 CFR 176.170 using sterilized boiling water, needed to satisfy the U.S. Government requirements for use of the inventive article (in the form of a cellulosic casing) in contact with food. The aforementioned Sethness types 858 and BC 420 caramel were used in these experiments and added to the viscose solution prior to aging in a manner analogous to the aforedescribed sample 8, during the manufacture of fiber-reinforced cellulosic casing. The loadings of caramel in the casings were 3.8 mg/in$^2$ (0.59 mg/cm$^2$) for the type BC 420 caramel ("420 casing") and 1.9 mg/in$^2$ (0.29 mg/cm$^2$) for the type 858 caramel ("858 casing"). The results for the short term boiling water test are summarized in Table D, and the results for the long term boiling water test are summarized in Table E.

In both tests 50 in$^2$ (322.58 cm$^2$) of casing was extracted in 100 ml solution. The short term boiling conditions were 100° C. for 30 minutes, and long term boiling conditions were 100° C. for 30 minutes with 10 days subsequent storage at room temperature.

TABLE D

| Casing Type | Solution (Extractant) Concentration (ppm) | | Transfer[1] To Product (ppm) |
|---|---|---|---|
| | Caramel 420 | Caramel 858 | |
| 420 Casing | 19.3 | | 3.9 |
| 858 Casing | | 2.4 | 0.5 |

[1]Calculated using 10 g product/in$^2$ (1.55 gm/cm$^2$) of casing

TABLE E

| Casing Type | Solution (Extractant) Concentration (ppm) | | Transfer[1] To Product (ppm) |
|---|---|---|---|
| | Caramel 420 | Caramel 858 | |
| 420 Casing | 11.9 | | 2.4 |
| 858 Casing | | 7.6 | 1.5 |

[1]Calculated using 10 g product/in$^2$ (1.55 gm/cm$^2$) of casing.

Inspection of Table D reveals that in the short term test, about one eighth as much of the darker and higher molecular weight type 858 caramel was dissolved in boiling water as the lighter and lower molecular weight type BC 420 caramel. Expressed on a transfer-to-product basis, the levels were 0.5 ppm for the 858 casing and 3.9 ppm for the 420 casing.

Inspection of Table E reveals that in the long term test, the boiling water extraction was 1.5 ppm for the 858 casing and 2.2 ppm for the 420 casing. The level for the 858 casing was three times higher than that of the short term test while that of the 420 casing was one half that of the short term test.

The short and long term 3% acetic acid extraction levels were in the same general range as boiling water and neither casing showed extraction in heptane at 120° F. (49° C.) during 30 minutes contact or during 10 hours contact at room temperature.

The caramel loadings and extractions percentages are summarized in Table F.

TABLE F

| Casing | Extractant | Condition | Caramel Microgram/in$^2$/cm$^2$ | Extracted[1] % of Total |
|---|---|---|---|---|
| 420 | Water | Short Term | 38.6 (5.98) | 1.0 |
| 858 | Water | Short Term | 4.8 (0.74) | 0.3 |
| 420 | Water | Long Term | 21.8 (3.38) | 0.6 |
| 858 | Water | Long Term | 15.2 (2.36) | 0.8 |

[1]Corrected for blank % of total based on loading levels of 3.8 mg/in$^2$ (0.59 mg/cm$^2$) of caramel 420 and 1.9 mg/in$^2$ (0.29 mg/cm$^2$) of caramel 858.

These data demonstrate that the caramel in the caramel-immobilized cellulose article is substantially nonextractable in water and steam because the extraction results indicate that 1% or less of the total amount of caramel applied was extracted.

Caramels are classified by caramel manufacturers in terms of their colors, based on constituents used to assist caramelization. These classes are as follows:

Class I: Plain Caramel Color
Class II: Caustic Sulfite Caramel Color
Class III: Ammonia Caramel Color
Class IV: Sulfite-Ammonia Caramel Color The aforedescribed Sethness types BC 420 and 858 caramels are Class IV, proposed sub-class SAC 2 and SAC 4 respectively. The molecular weight ranges in wt.% for these sub-classes are reported as follows:

| Molecular Weight | SAC 2 | SAC 4 |
|---|---|---|
| Above 10,000 | 10 | 27 |
| 2,000-10,000 | 6 | 14 |
| Below 2,000 | 84 | 59 |

EXAMPLE VI

A series of tests were conducted which demonstrate that in addition to Class IV, Class II and III caramels may be used in the practice of this invention but not Class I.

Caramels having the following tinctortial powers were introduced to aged viscose in the manner of sample 6 of Example I.

TABLE G

| Caramel[1] | Tinctorial Power |
|---|---|
| BC #420 (Class IV) | 0.420 |
| YT #25 (Class I) | 0.025 |
| RT #80 (Class II) | 0.082 |
| P255 (Class III) | 0.255 |
| DS #400 (Class IV) | 0.405 |

[1] All caramels are Sethness product designations

The specific caramel to viscose mixtures were as follows:

TABLE H

| Sample | Composition |
|---|---|
| 18 | 78 gm YT #25 to 500 gm of viscose |
| 19 | 20.8 gm RT #80 to 500 gm of viscose |
| 20 | 6.6 gm P225 to 500 gm of viscose |
| 21 | 4.7 gm DS #400 to 500 gm of viscose |
| 22 | 20.8 gm BC #420 (20 wt. %) to 500 gm of viscose |

The final cost film samples showed that the Class I caramel of sample 18 was substantially completely leached out from the film during the cellulose regeneration, washing process. In contrast, the Classes II, III, and IV caramels of samples 19-22 were substantially immobilized in the cast film.

It is believed that the degree of caramel leach out from the caramel-containing cellulosic article of this invention is related to the molecular weight distribution of the caramel, and the molecular weight distributions for the four classes are as follows:

TABLE I

| Molecular Weight[1] | Class I | Class II | Class III | Class IV |
|---|---|---|---|---|
| Below 2,000 | — | 87% | 64% | 55% |
| 2,000-10,000 | — | 10% | 4% | 15% |
| Above 10,000 | — | 3% | 32% | 30% |
| Arithmetic Average[2] | — | 2600 | 4700 | 5000 |

[1] Information from Sethness Products Company
[2] Arithmetic average determined with values of 2,000, 6,000 and 10,000 for the above three ranges.

The molecular distribution from Table I shows that Class IV caramel has the highest percentage of caramel components above the molecular weight of 10,000. Class I has the lowest molecular weight distribution and lowest average molecular weight. Analysis by another party indicates that the arithmetic average molecular weight of Class I caramel appears to be no more than about one-half the average molecular weight of Class II caramel, so based on Table I it is no more than about 1300. Accordingly, in the preferred practice of this invention the caramel has an arithmetic average molecular weight of greater than about 1300.

It will be noted from Table I that Class IV caramel has 13% by wt. constituents of molecular weight above 2,000. Accordingly in another preferred practice, caramel useful in this invention has at least 13 wt.% constituents with molecular weight above 2,000.

It is speculated that the relatively low molecular weight caramel of Class I may more readily migrate through the cellulosic article, and the higher molecular weight of caramel Classes II, III and IV are immobilized in the cellulosic article.

EXAMPLE VII

A series of colorimeteric tests were conducted to compare the caramel-immobilized cellulosic article of this invention with a caramel-impregnated prior art cellulosic article. In each instance the same type of fiber reinforced cellulosic casing (flat width 16.5 cm) was used. For sample 23, the caramel was applied to the casing inner surface by slugging and impregnation in the casing wall according to the prior art teachings of U.S. Pat. No. 4,219,574 (Examples 7-9 using a mineral oil emulsion). For samples 8 and 9, the caramel was introduced to the viscose prior to extrusion (this invention) as previously described in Example II.

The caramel loading and the colorimetric values of each sample were as follows, with lower "L" values indicating greater darkness and higher "a" and "b" values indicating greater color intensity.

TABLE J

| Sample No. | Caramel Loading (mg/in²) | | Colorimetric Values | | |
|---|---|---|---|---|---|
| | AP #175 (mg/cm²) | BC #420 (mg/cm²) | L | a | b |
| 23 | 6.3 (0.98) | 2.5 (0.39) | 69 | 2 | 21 |
| 8 | 0 (0) | 3.8 (0.59) | 52 | 10 | 27 |
| 9 | — | — | 28 | 14 | 15 |

Based on the tinctorial power calculations, 6.3 mg/in² (0.98 mg/cm²) of caramel type AP #175 (tinctorial power equal to 0.175, purchased from Sethness Products Company), is comparable in darkness to 2.6 mg/in² (0.40 mg/cm²) of type BC #420 caramel. This may be added to the quantity of type BC #420 caramel actually used in sample 23. Therefore, the prior art sample 23 has a comparable loading of 5.1 mg/in² (0.79 mg/cm²) of BC #420 caramel.

The resulting caramel-containing articles were compared in terms of color intensity, color uniformity, and water and steam extractability. The color uniformity was visually inspected. In addition, photomicrographs at 25× magnification of the sample inner surfaces clearly show granular, relatively dark distinct particles on a lighter background for the prior art sample 23. In contrast, the sample 8 of this invention has a very uniform non-granular appearance with no perceptable particles.

Extractability of the samples was determined by soaking 20 in² (129 cm²) of casing in 100 gm of water at 25° C. for 30 minutes, and the results are summarized in Table K.

TABLE K

| Sample No. | Overall Color | | Water Extractability |
|---|---|---|---|
| | Color (L) | Uniformity | |
| 23 | light brown (69) | poor (granular) | complete |
| 8 | dark brown (52) | very good | insignificant |
| 9 | very dark brown (28) | very good | insignificant |

Another advantage of this invention relates to the well-known antiblock characteristic of surfaces.

Table K demonstrates that unexpectedly the article of this invention provides a darker and more intense color than a prior art slugged caramel-impregnated cellulose article having higher tinctorial power. This also suggests that a desired caramel color darkness and intensity may be achieved with a smaller quantity of caramel than possible with caramel slugging.

Because of its granular appearance, sample 23 would only be marginally commercially acceptable. This demonstrates that there is a limit to the uniform, nongranular color intensity which can be obtained by caramel impregnation. Based on this test, it appears that a caramel impregnated cellulosic article with a colorimetric value below about 60 which is also sufficiently uniform for commercial acceptability cannot be prepared by presently known methods. In contrast, sample 9 demonstrates a caramel colorimetric value of 28 in a uniform and nongranular form. Accordingly, a preferred embodiment of the immobilized caramel-containing cellulosic article of this invention has a colorimetric L value below about 50.

A possible explanation for the phenomenon of greater color intensity of the present inventive article compared to the prior art caramel impregnated article is as follows:

Since the water and steam nonextractable caramel in this article is evenly distributed in the cellulose, the individual caramel particles can be imagined to be infinitely small droplets (spheres). The equation for spheres are:

$$S = 4\pi R^2 \quad \text{(Equation I)}$$

$$V = \frac{4}{3}\pi R^3 \quad \text{(Equation II)}$$

$$\frac{S}{V} = \frac{3}{R} \quad \text{(Equation III)}$$

where:
S = sphere surface area
V = sphere volume
R = sphere radius.

Equation III shows that as sphere radius decreases, the sphere area increases per unit volume. In the case of the caramel-containing article of this invention such as sample 8, the so called "small droplets" of caramel have substantially larger surface per volume ratio when compared to prior art sample 23. The higher surface area per volume ratio of caramel in the inventive article means that more caramel color component is exposed, and therefore reflects higher color intensity. It should also be noted that the impregnated caramel in sample 23 was virtually completely water soluble and would be completely lost if the casing is water soaked prior to stuffing.

Unlike the caramel-containing cellulosic articles prepared by the prior art slugging method (for example sample 23) which require antiblock additives to keep adjacent contacting surfaces from sticking together, the article of this invention (for example sample 8) did not include an antiblock additive and did not exhibit a blocking problem.

EXAMPLE VIII

An experiment was performed which demonstrates that synthetic caramel of very low molecular weight may be used in the practice of this invention. A synthetic caramel type natural mixture comprising D-xylose, citric acid and 4-aminobutyric acid was prepared having a molecular weight of about 400. The procedures was to mix the composition of Table L and then heat same to about 100° C.

TABLE L

| Composition | Actual Wt. | Wt. % |
|---|---|---|
| 4-aminobutyric acid | 20.6 | 12.8 |
| Citric Acid | 10.0 | 6.2 |
| D-Xylose | 30.0 | 18.7 |
| Water | 100.0 | 62.3 |
| | 160.6 gm | 100% |

It developed the characteristic dark brown color associated with the Browning reaction, and was added to the viscose prior to aging in the same manner as sample 6, in quantity sufficient for a loading of about 14 mg/in$^2$ casing surface, identified as sample 24. The resulting caramel-containing cellulosic casing had the same dark brown color as the caramel type BC #420 immobilized cellulosic casing of equal caramel loading of this invention (sample 8). However, when sample 24 was subjected to the aforedescribed water-steam extraction, substantially all of the synthetic caramel was leached out of the casing. A possible explanation of this difference between the two caramel-containing cellulosic casings is the difference is caramel molecular weights. The average molecular weight of the caramel in sample 8 is about 3000, in contrast to the molecular weight of about 400 for the synthetic caramel of sample 24. As previously discussed, it is theorized that relatively low molecular weight caramels are less readily immobilized than high molecular weight caramels.

EXAMPLE IX

These experiments also demonstrate that in the present invention the caramel is physically rather than chemically immobilized in the cellulosic article. The general procedure was to xanthate and regenerate the caramel, and determine whether its characteristic brown color is retained during these steps. The ultraviolet spectra of the various samples are summarized in Table M.

The previously described viscose-regeneration process of Example I was followed by mixing 8.9 gm Sethness type BC 420 caramel with a solution of 4.17 gm NaOH and 14.73 gm distilled water. The mixture was xanthated under the Example I conditions with 2.6 gm $CS_2$, and the resultant solutions diluted with a solution of 3.8 gm NaOH and 92.9 gm water to produce a pseudo viscose based on caramel instead of cellulosic pulp. The final solution of 7.0 wt.% caramel and 6.3 wt.% caustic was very dark brown in color with no suspended solids. Regeneration was accompanied by a strong $H_2S$ odor and the release of large volumes of gas. The regenerated solution remained very dark brown in color and free of solids. However, on refrigerating overnight, the solution changed to a suspension containing a finely divided, brownish, easily suspended solid.

A portion of the suspension was adjusted to a pH of 5 with dilute caustic, yielding a very dark brown cloudy solution. Dialysis against running tap water in cellulose dialysis tubing (Spectrapor grade 6, molecular weight cutoff 1000) resulted in a very dark brown nearly solid-free solution (sample 25). The ultraviolet spectrum of this sample 25 in ethylenediamine solvent was identical to that of a control caramel (type BC 420) sample 26 in ethylenediamine, with the maximum absorption at 280 nm and a secondary shoulder peak at 300 nm. This demonstrates that the caramel does not undergo significant chemical change as a consequence of the viscose process, and retains its water solubility. It therefore follows that the caramel is physically immobilized in the cellulosic article of this invention.

Another portion of the original suspension was gravity-filtered through paper at pH 1.7 to isolate very dark brown solids and a light brown solid-free filtrate. Dialysis of these fractions (solids in water at pH of 5, and filtrate "as-is") and examination in ethylenediamine solvent provided ultraviolet spectra which were slightly different from the control. The solids-based spectrum (sample 27) had a shifted maximum absorption at 270 nm with the same 300 nm secondary shoulder peak. The filtrate-based spectrum of sample 28 had its maximum absorption at 284 nm and a shoulder at 320 nm. These slight spectral shifts may be due to a molecular weight fractionation process.

EXAMPLE X

These experiments describe and demonstrate a procedure to identify the caramel in the present article.

Extraction of caramel-immobilized cellulosic casing sample 16 of this invention with ethylenediamine (sample 29) and 25% ammonia/75% ammonium thiocyanate solvents (sample 30) provided fractions having ultraviolet spectra with maximum absorption at 284 nm and secondary shoulder peaks at 320 nm, as with sample 28. The ethylenediamine solution for this test was prepared by simple extraction. The procedure with NH3/NH4SCN involved slurrying ¼-½ inch pieces of casing at 6% by wt. in the solvent at room temperature with agitation. The supernatant turned dark brown and the casing swelled but retained its integrity within about 2 hours. The mixture was diluted by about one-half with distilled water and the liquid decanted, dialyzed and filtered. This procedure may be used to identify caramel in the inventive article, as previously described.

In contrast, a synthetic caramel (sample 31) prepared by the Maillard reaction according to Example VIII showed a significantly different ultraviolet spectrum with maximum absorbance over the range of 280–297 nm and a secondary strong absorbance at 330 nm.

TABLE M

| Sample | Maximum (nm) | Secondary (nm) |
|---|---|---|
| 25 | 280 | 300 |
| 26 | 280 | 300 |
| 27 | 270 | 300 |
| 28 | 284 | 320 |
| 29 | 284 | 320 |
| 30 | 284 | 320 |
| 31 | 280–297 | 330 |

The ultraviolet spectra for certain brown materials are shown in FIG. 1, a graph with ultraviolet absorbance as the ordinate and wave length as the abscissa.

Pure Sethness type BC 420 caramel and the caramel of sample 8 of the present invention have substantially identical curves, and are shown as a solid line. The ultraviolet spectra of the sample 31 Maillard reaction product, having a dark brown color, is shown in FIG. 1 as a dashed line. Finally, the ultraviolet spectra of brown pigment (a mixture of pigment green 7 and pigment orange 31 designations by the Society of Dryers and Colourists, Research Triangle Park, N.C.) is shown in FIG. 1 as a dash-dot-dash line. Inspection of this FIG. 1 reveals that the ultraviolet spectra of pure caramel and the caramel-containing article of this invention are unique in having maximum absorption at about 284 nm. and secondary shoulder peaks at about 320 nm., but no other strong absorption peaks.

A general procedure for identifying the immobilized caramel-containing cellulosic article of this invention is as follows:

A sample of the cellulosic article (containing an unknown colorant retained in an unknown manner) is extracted by the technique of Example V to quantify the amount of extractable colorant. As previously demonstrated, the inventive article shows less than 1% extraction (by water) of the total amount of the contained caramel. In contrast, if the colorant is caramel which is impregnated in the cellulosic article according to prior teachings, the colorant will be substantially completely extracted by water.

The presence of caramel can be established by the ultraviolet spectrum of several drops of the aqueous extract in ethylenediamine, in the aforedescribed manner, and illustrated by FIG. 1. A more thorough extraction of caramel from the inventive article may be accomplished by use of the 25% NH3/ 75% NH4SCN solvent following a procedure similar to that described in Example IV. A 6 wt.% solids slurry of ¼-½ inch (major dimension) pieces of the article in this solvent is agitated for one hour, then processed through four freeze-thaw cycles at −65° C. (dry ice) and room temperature respectively. The viscous mixture is poured with vigorous stirring into about 2–2.5 times its volume of 10% by weight sulfuric acid. If the article contains caramel, heat and ammonia will evolve to produce a swollen gel with a light brown supernatant. After standing overnight, the gel is suction filtered and a golden brown filtrate will result if previously immobilized caramel is present. The filtrate is dialyzed, filtered and diluted with ethylenediamine to provide an ultraviolet test solution. If caramel is present in the extract, the ultraviolet spectrum will provide peaks similar to Table M and FIG. 1 with a maximum absorption at about 284 nm and a secondary shoulder at about 320 nm, but no other major peaks.

While certain embodiments of this invention have been disclosed hereinabove, those skilled in the art will appreciate that modifications may be made therein without departing from the spirit and scope of the invention.

What is claimed is:

1. A caramel-containing, wood-derived liquid smoke impregnated, cellulosic article wherein the caramel is uniformly distributed through the article mass and across the article surface in immobilized relation with the cellulose, without being in the chemical bonded state, so as to be substantially nonextractable in water and steam and impart a uniform nongranular dark brown appearance to said article, the liquid smoke being impregnated in at least one surface of said article and transferable through the caramel-containing cellulosic article mass to color and flavor absorbable material contiguously associated with a second surface of said article, without simultaneous transfer of said caramel to said absorbable material.

2. An article according to claim 1 wherein the wood-derived liquid smoke contains tar.

3. An article according to claim 1 wherein the wood-derived liquid smoke is tar-depleted.

4. A caramel-containing, wood-derived liquid smoke impregnated, cellulosic casing wherein the caramel is uniformly distributed through the casing wall and across the casing surface in immobilized relation with the cellulose, without being in the chemical bonded state, so as to be substantially nonextractable in water and steam and impart a uniform nongranular dark brown appearance to said casing, the liquid smoke being transferable through the caramel-containing cellulosic casing wall to color and flavor absorbable material contiguously associated with the inner wall of said casing, without simultaneous transfer of said caramel to said absorbable material.

* * * * *

UNITED STATES PATENT AND TRADEMARK OFFICE
CERTIFICATE OF CORRECTION

PATENT NO. : 4,781,931

DATED : Nov. 1, 1988

INVENTOR(S) : Shiu-Chung Jon and Myron Donald Nicholson

It is certified that error appears in the above-identified patent and that said Letters Patent is hereby corrected as shown below:

In col. 15, line 44, change "cost" to --cast--.

Signed and Sealed this

Eighth Day of May, 1990

*Attest:*

HARRY F. MANBECK, JR.

*Attesting Officer*     *Commissioner of Patents and Trademarks*